United States Patent [19]
Barth et al.

[11] B 3,981,170
[45] Sept. 21, 1976

[54] APPARATUS FOR ASSEMBLING A SCREW AND COMPRESSIBLE WASHER

[75] Inventors: Gerald Dean Barth, Elgin; David Prugh Wagner, Geneva, both of Ill.

[73] Assignee: Illinois Tool Works Inc., Chicago, Ill.

[22] Filed: May 8, 1975

[21] Appl. No.: 575,757

[44] Published under the second Trial Voluntary Protest Program on January 27, 1976 as document No. B 575,757.

Related U.S. Application Data

[62] Division of Ser. No. 474,502, May 30, 1974, Pat. No. 3,906,567.

[52] U.S. Cl. ............................... 72/88; 10/155 A; 72/469
[51] Int. Cl.² ........................................... B21H 3/06
[58] Field of Search ............ 10/10 R, 155 R, 155 A; 72/88, 89, 90, 469

[56] References Cited
UNITED STATES PATENTS

| | | | |
|---|---|---|---|
| 2,283,494 | 5/1942 | Erdman | 72/88 X |
| 2,371,463 | 3/1945 | Olson | 72/469 |
| 3,163,196 | 12/1964 | Hanneman | 72/88 X |

FOREIGN PATENTS OR APPLICATIONS

| | | | |
|---|---|---|---|
| 19,847 | 3/1971 | Japan | 72/88 |
| 1,469,156 | 12/1965 | France | 10/155 A |

*Primary Examiner*—C. W. Lanham
*Assistant Examiner*—E. M. Combs
*Attorney, Agent, or Firm*—T. W. Buckman; R. W. Beart

[57] ABSTRACT

A method and apparatus for assembling a screw and an axially compressible washer and rolling threads on the screw blank in a single operation that results in a shank configuration immediately beneath the head of the screw that allows complete compression of the washer. The method involves assembling a washer on the blank and retaining it thereon while the washer and screw assembly are subjected to swaging forces from opposing reciprocating thread rolling dies. The washer is retained on the blank in such a manner as to allow the thread rolling dies to swage an upper section of the blank and thereafter move the washer upwardly directly adjacent the head in a single thread rolling pass.

8 Claims, 12 Drawing Figures

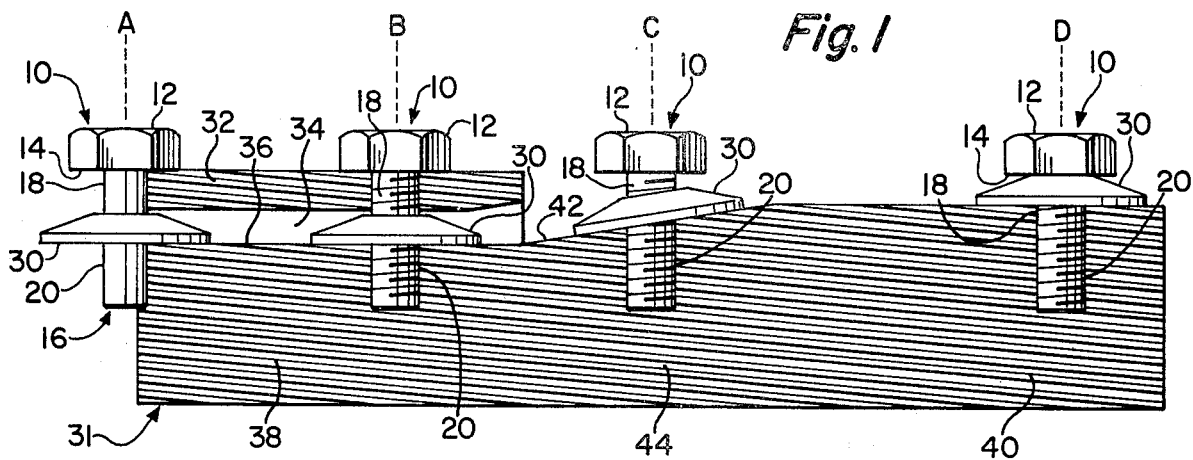
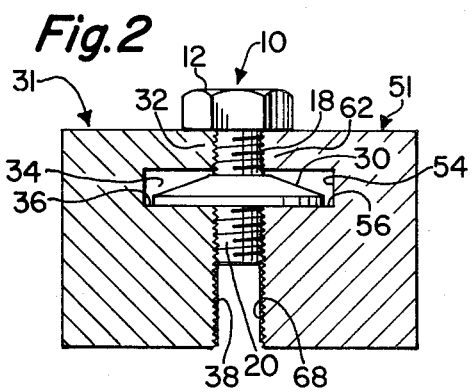
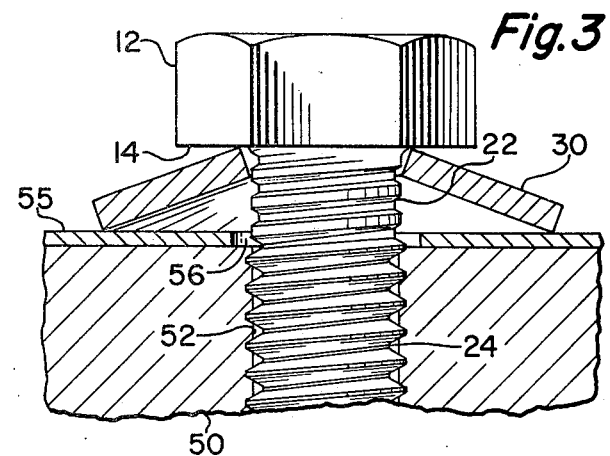
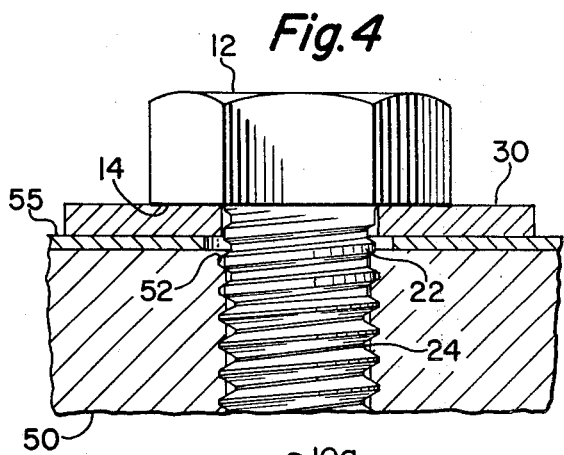
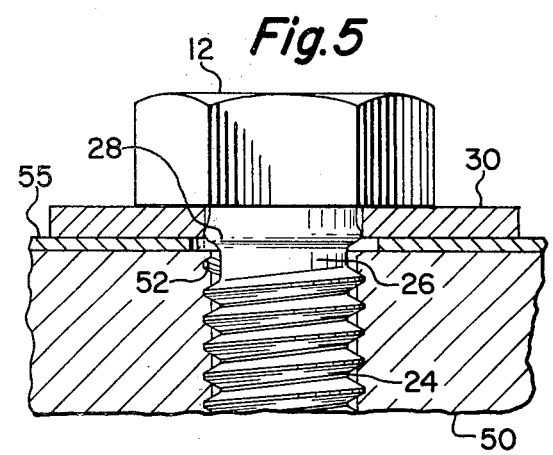
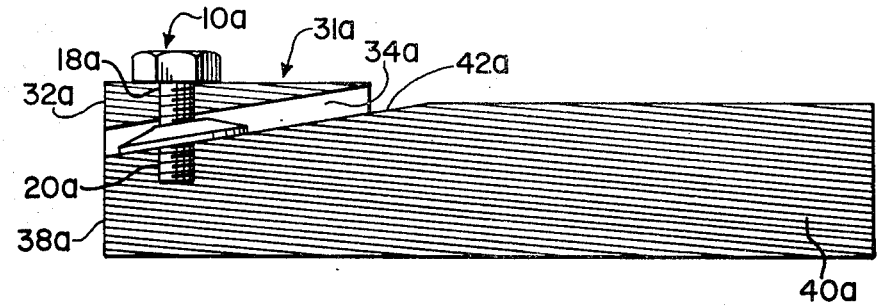

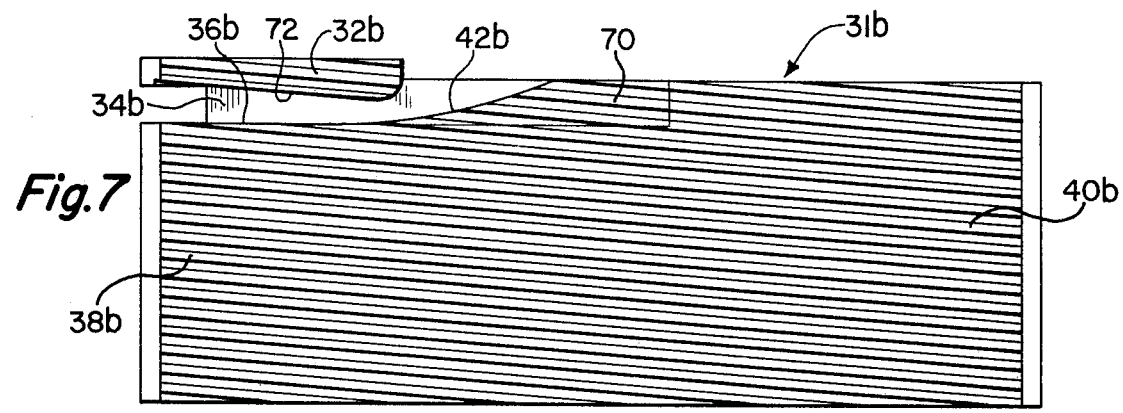
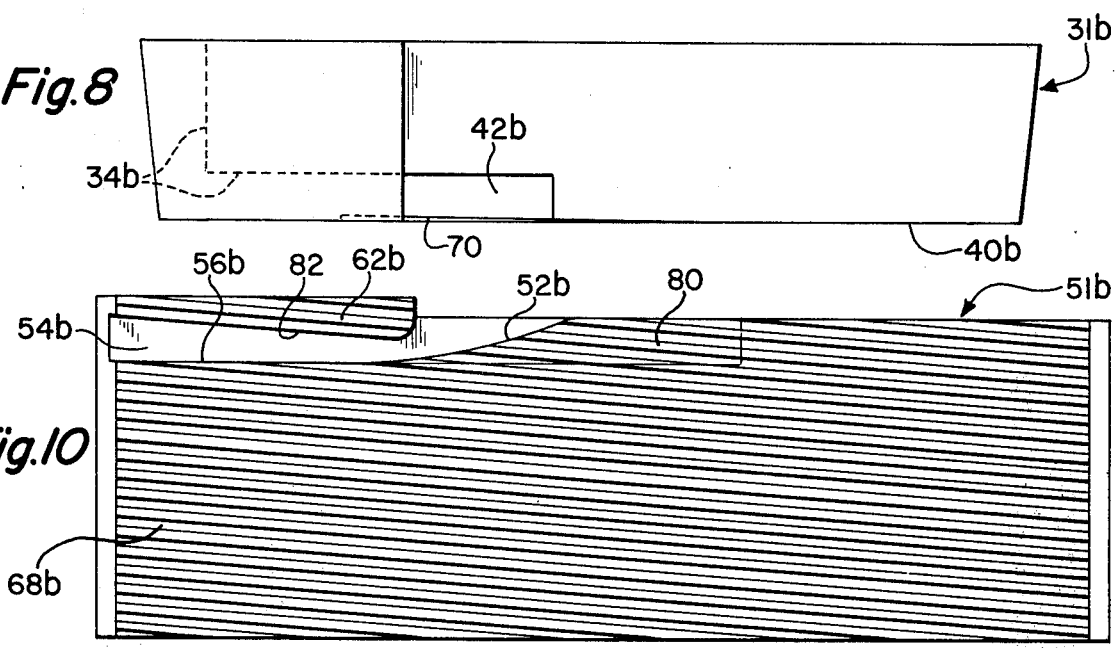
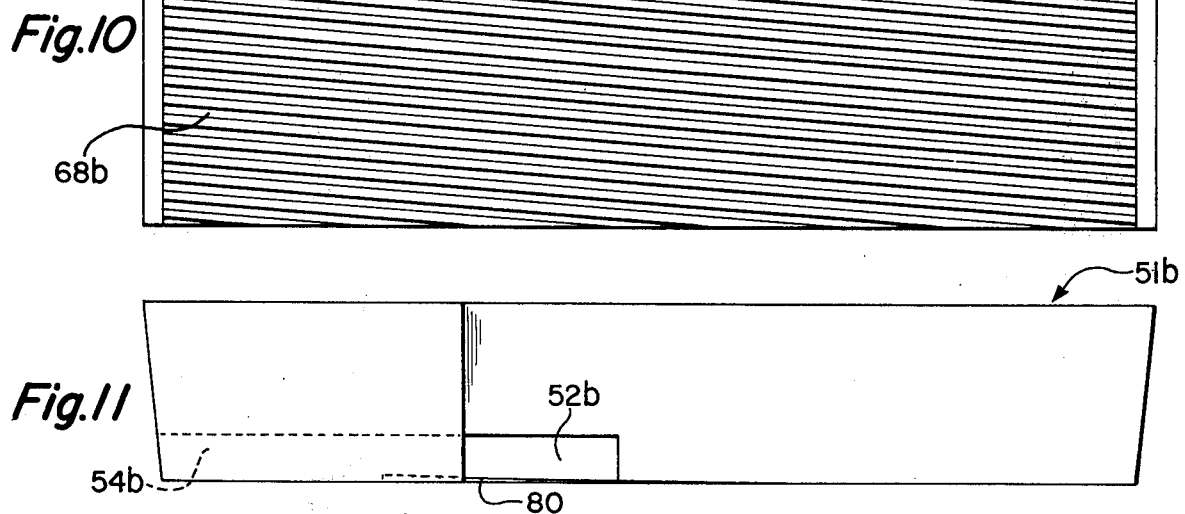
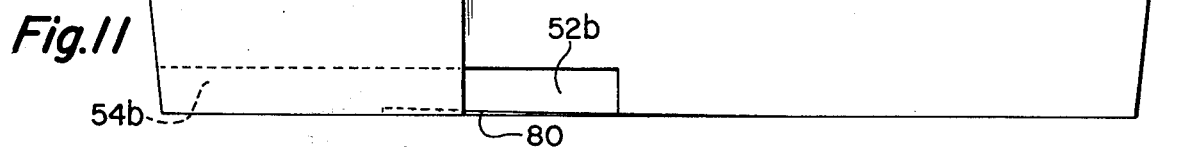
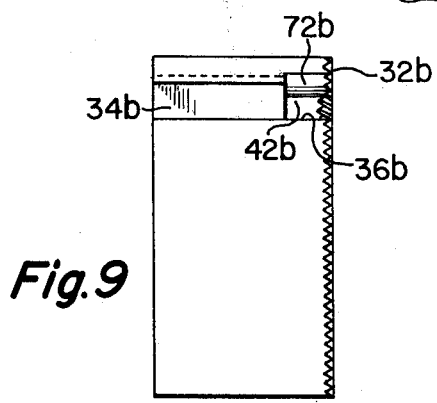
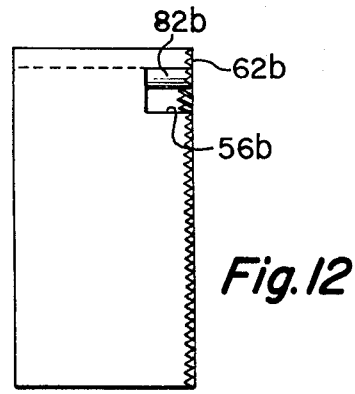

APPARATUS FOR ASSEMBLING A SCREW AND COMPRESSIBLE WASHER

This is a continuation, X division, of application Ser. No. 474,502, filed May 30, 1974, now U.S. Pat. No. 3,906,567.

BACKGROUND OF THE INVENTION

This invention relates to threaded fastener and washer assemblies, and is more particularly concerned with a method of permanently associating a compressible washer with a threaded fastener during the formation of threads on the fastener blank.

Screw or bolt and washer assemblies have heretofore been provided by placing the washer on the screw blank prior to the formation of the threads on the blank so that the crest diameter of the threads subsequently formed is greater than the internal diameter of the washer, thus trapping the washer adjacent the head of the screw. However, with this method it is not possible to provide thread convolutions directly adjacent the bearing surface of the head. Therefore, when a compressible washer, for example a conical washer, is associated with the screw there will be no thread formation above the plane of the outer diameter of the uncompressed washer. Such a configuration will not permit the washer to be completely compressed when the assembly is inserted in a tapped aperture since the unthreaded shank portion beneath the surface of the washer will resist complete axial insertion of the screw.

There have been various attempts to solve the problem but unfortunately all such prior art attempts have required additional and costly manufacturing steps. For example, it has previously been proposed to roll the threads on a screw blank and thereafter telescopically associate the washer with the blank. In such proposals it is required that the assembly be subjected to a subsequent staking or deforming operation to insure that the washer is retained on the shank. It has also been proposed to roll the screw blank with a shallow thread formation including a crest diameter not greater than the inner diameter of the washer, and thereafter telescopically associate the washer and screw. This operation requires the screw-washer combination to be subjected to a second and final thread rolling operation to produce fully formed threads on the shank below the washer.

SUMMARY OF THE INVENTION

It is an object of the present invention to provide a screw or bolt and compressible washer assembly in which the washer is retained on the shank adjacent the head and which assembly is capable of being inserted into an aperture without interference between the shank portion and the aperture and allows the washer to completely compress.

It is a further object of the invention to provide a method and an apparatus for thread rolling and selectively reducing the diameter of the upper portion of the shank while securing the washer from removal from the shnak all in a single operation.

It is a more specific object of the invention to provide a thread rolling die that will retain and support a washer intermediate the longitudinal margins of the die so that an upper and lower shank portion can be swaged simultaneously.

The above mentioned and other objects and advantages are attained in the present invention wherein a pair of relatively reciprocating thread rolling dies are provided with a slot extending inwardly from the work engaging face of each die and adjacent the blank entering margin of each die. The slot is spaced downwardly from an upper longitudinal margin of the die to provide axially spaced swaging surfaces on a first longitudinal section of the die. This slot will be capable of receiving and supporting a compressible washer as the blank is rolled between opposing die faces. A subsequent longitudinal section of the die will include a ramp which will force the washer upwardly on the shank over the partially formed threads in the upper section of the shank to become directly adjacent the undersurface of the head of the blank. Thereafter, fully formed threads will be formed on the blank by the remaining section of the die. These threads will have a crest diameter greater than the inner periphery of the washer to retain the washer thereon. This method and apparatus will thus provide threads or a selective reduction in diameter in the upper portion of the shank to allow the washer to be completely compressed as the screw is inserted in a tapped aperture.

BRIEF DESCRIPTION OF THE DRAWINGS

FIG. 1 is a side elevational view of one of a pair of thread rolling dies of the invention showing a screw blank and washer in various stages of development along the longitudinal extent of the die.

FIG. 2 is a sectional view of the die assembly with a blank and washer positioned between opposing thread rolling dies at station "B" shown in FIG. 1.

FIG. 3 is a sectional view of a screw and washer assembly, made in accordance with the invention, when it is associated with a workpiece and prior to complete compression of the washer.

FIG. 4 is a sectional view of the screw and washer assembly shown in FIG. 3 and showing the washer completely compressed against the workpiece.

FIG. 5 is a sectional view, similar to the view of FIG. 4, showing an alternate embodiment of a screw and washer assembly also made in accordance with this invention.

FIG. 6 is a side elevational view of another embodiment of a thread rolling die consistent with the teachings of this invention.

FIG. 7 is a side elevational face view of an alternate embodiment of a stationary die incorporating the features of this invention.

FIGS. 8 and 9 are top and entering end views of the stationary die shown in FIG. 7.

FIG. 10 is a side elevational face view of an alternate embodiment of a moving die which incorporates the features of this invention and which is adapted to be used with the die of FIG. 7.

FIGS. 11 and 12 are top and entering end views of the moving die shown in FIG. 10.

DETAILED DESCRIPTION OF THE PREFERRED EMBODIMENTS

Referring now to the drawings, a blank 10 represents a typical screw or bolt blank which includes an enlarged head 12 and an elongate shank 16. Washer 30 is shown as a conical spring washer but it should be understood that the washer may be of any axially compressible type, such as dome, Belleville, twisted tooth, helical spring, etc., and still be contemplated by this invention. In fabricating a screw and washer assembly in accordance with this invention, the unthreaded blank is telescopically associated with the washer 30 in such a manner as to position the washer intermediate the bearing face 14 and the extremity of the shank, thus providing axially spaced unthreaded shank portions 18 and 20. A blank and washer assembly so positioned is fed to the entering margins of a pair of relatively reciprocating thread rolling dies 31 and 51. In accordance with conventional thread rolling procedure, a blank positioned between entering margins of a pair of dies is swaged by rotating the blank between such a pair of dies with one of the dies being stationary and the other reciprocating longitudinally of the stationary die.

One die 31, of a pair of dies, is shown in FIG. 1 associated with the blank and washer assembly and showing the various stages of assembly performed during a single reciprocation of the pair of dies.

The thread rolling die 31 includes a first longitudinal section with a slot 34 formed in the work engaging face thereof and which extends inwardly a predetermined distance from this face. The work engaging face of the preferred embodiment will be of somewhat conventional thread rolling die design with the exception of the slot. The ribs and grooves 44 formed on this die will be relatively shallow and, in fact, will gradually increase in height from the entering margin to a point intermediate the entering and exiting margins of the die. The slot will have a width substantially equal to the axial extent of uncompressed washer 30 to receive and support a washer therein as the screw blank passes over the work engaging surfaces of the die. The lowermost surface 36 of the slot forms a ledge which will support the washer during this longitudinal movement of the assembly. Upper and lower spaced swaging portions 32 and 38 respectively are formed on the face of the die as a result of the slot 34.

In the preferred embodiment, a ramp 42 is provided intermediate the slot and a finishing section 40 of the thread rolling die. This ramp is basically a longitudinal extension of the shelf 36 which is inclined upwardly toward an upper longitudinal margin of the die. As will be pointed out later, an alternate embodiment of the invention will incorporate the slot and the ramp in such a manner as to provide the ramp at the entering margin of the die.

The method of assembly in accordance with this invention can be visualized most clearly with reference to FIGS. 1 and 2. Work stations A-D show the various progressive stages of fabrication of the blank and washer as it traverses along the longitudinal extent of the dies and between opposing work engaging faces of a pair of reciprocating dies 31 and 51. Station A shows the blank 10 with the compressible spring washer 30 located intermediate the head and the blank extremity to provide a shank portion 18 above the washer and a shank portion 20 below the washer. This positionment and association of the washer 30 with the slot 34 permits the upper shank portion 18 to be swaged in a manner to be set forth herein.

Station B depicts the configuration of the blank and washer assembly as a movable die 51 advances parallel with the face from the entering margin of a stationary die 31 to advance the blank and washer longitudinally along the work engaging faces of the die. The upper swaging section 32 will deform the upper shank section 18 into a partial thread form wherein the crest and root diameters are not completely formed. In the preferred embodiment, the crest diameter formed on the upper shank portion 18, during the progression across the forming section 32, will be less than the diameter of the inner periphery of the washer 30. The root diameter of the partial thread formation will be small enough to permit this portion to enter a tapped hole. Simultaneous with the formation of partial thread forms on the upper portion 18 of the blank, the lower forming surface 38 of the die may form thread convolutions with a matching or aligned helix on the lower shank 20. The movable die 51 will include upper and lower swaging portions, slot, ledge and ramp portions 62, 68 54, 56 and 52 respectively, positioned to cooperate with the slot, ledge and ramp portions of the fixed die.

Station C depicts the utility of the ramp 42 in forcing the washer upwardly as the blank continues to progress across the face of the die 31. Since the upper shank section 18 will not include a crest diameter which is greater than the inner periphery of the washer, this axial movement of the washer can be easily accomplished without damage to the upper thread forms.

Station D shows the blank and washer assembly nearing the completion of the swaging operations in the second longitudinal finishing section 40. With the washer 30 directly adjacent to the bearing surface 14 of the blank, the thread rolling die will now completely form the thread convolutions to provide a crest diameter which is greater than the diameter of the inner periphery of the washer, thus trapping the washers on the shank and forming a preassembled unit.

The screw and washer assembly made in accordance with the method just described can be shown in more detail in FIGS. 3 and 4 with the advantages thereof becoming apparent by examination of these figures. The assembly will include a relatively short axial extent of partially formed threads 22, as a result of the swaging operation of the upper swaging section 32 of the die. It will be noted that the crests of this partially formed section will not be fully formed nor will the roots be as deep as the fully formed thread portion 24. However, when the screw and washer assembly is associated with a primary workpiece 50 having a tapped hole 52, the washer may be totally compressed if desired. It should be understood that the tapped hole 52 may be as a result of a previous tapping operation or as a result of self-tapping features on the entering extremity of the screw.

The advantages of an assembly made in accordance with this invention are apparent from FIG. 4. Even when a relatively thin secondary workpiece 55 is clamped against the primary workpiece 50, the compressible washer 30 will be allowed to completely compress since there will be no substantial interference between a tapped hole 52 and the shank section immediately adjacent the head of the bolt. Partially formed threads 22 will readily follow the helix of the tapped hole to permit this total compression of the washer. As pointed out earlier, prior art screw and washer assemblies would not allow such complete compression of the washer since conventional assembly techniques would leave an axial extent of the shank unthreaded and thus of a diameter greater than the minimum diameter of the tapped hole.

The invention described above is not necessarily limited to the formation of partial thread forms on the upper shank portion 18 of the blank. For example, the upper swaging portion 32 of the die may include swaging surfaces designed to deform the upper shank portion to include an annular recess of a predetermined axial extent and of a diameter which is less than the minor diameter of an associated tapped hole. Such an upper die portion 32 could also be configured to displace the material of the blank upwardly to form a shoulder of greater diameter than the diameter of the inner periphery of the washer. FIG. 5 shows such an alternate embodiment in which recess 26 will be of a diameter small enough to permit the shank to enter the tapped hole 52 without substantial resistance thereby allowing the washer 30 to totally compress. In addition, the shoulder 28 serves to retain the washer in an abutting or directly adjacent position to the head.

While the shoulder 28 will present some resistance to the movement of the washer upwardly as the blank and washer assembly progress across the ramp 42, the resistance will be slight and the washer will thus readily snap over the enlarged shoulder to assume the position shown in FIG. 5.

While the preferred embodiment of the thread rolling die of the present invention envisions a slot which extends longitudinally of the die face generally parallel to the upper longitudinal margin of the die, it should be understood that other configurations of a die can be utilized and still come within the spirit and broad scope of this invention. For example, FIG. 6 shows an alternate embodiment in which the ramp portion 42a extends directly from the entering margin of the die 31a. Thus, the slot 34a will be inclined upwardly and the upper swaging portion 32a will be substantially triangular. In such an embodiment, it is apparent that the swaging of the upper section 18a and the axial movement of the washer 30a are substantially simultaneous.

The pair of opposing stationary and moving dies 31b and 51b respectively, shown in FIGS. 7–12, describe further features which may be included on dies consistent with the invention discussed above.

The stationary die 31b includes a slot 34b extending from the entering margin longitudinally and merging into a curved ramp portion 42b. The slot separates the first longitudinal section of the die into upper and lower swaging sections 32b and 38b respectively. It will be noted that the slot 34b will extend inwardly from the entering margin of the die as well as inwardly from the work swaging face. This facilitates the transfer of the screw-washer combination to the entering margin for beginning the thread rolling operation with the washer positioned and retained intermediate the shank.

It is important to note that the upper surface 72 of the slot is inclined downwardly preferable at the same angle as the helix to be generated on the shank. This configuration will eliminate the formation of an annular ring or bridge between crests of threads at the juncture of the incompletely formed upper threaded portion and completely formed lower threaded portion.

It is also to be noted that a small section 70 of thread forming ribs and grooves immediately following the ramp 42b is relieved or constructed so that the ribs progressively increase in height from the ramp portion to a point intermediate the second or finishing section 40b. This construction permits the formation of threads, without substantial pressure, on the shank in the area that was not swaged by the first swaging section.

The moving die 51b is configured to be complementary in all respects to the stationary die with upper and lower swaging portions 62b and 68b extending from the entering margin and including a slot 54b separating these two portions and merging into ramp 52b. The ledge 56b in cooperation with ledge 36b will retain a washer at a predetermined level. The upper surface 82 of the slot 54b will be inclined similar to the upper surface 72 on the opposing die. A small section 80 of the finishing portion of die 51b will present relieved swaging surfaces to oppose section 70 on the die 31b.

Thus it is apparent that there has been provided, in accordance with the invention, a method and apparatus that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A thread rolling die assembly for fabricating a telescoping screw and compressible washer assembly "which includes an axially compressible washer positioned on a screw blank having an unthreaded shank comprising upper and lower regions and a radially enlarged head", said die assembly comprising a workpiece engageable face with a first longitudinal section having an upper portion with screw blank swaging means, slot means extending inwardly from the workpiece engageable face and located directly beneath the upper blank swaging means, the slot means including a ledge adapted to receive and support said compressible washer on the unthreaded screw shank while the upper region of the shank is swaged by the upper swaging means, ramp means adapted to move the washer upwardly on the screw shank as the screw-washer assembly moves longitudinally of the workpiece engageable face and, a second longitudinal die section having thread swaging surfaces adapted to deform the lower region of the shank into a helical thread form with a crest diameter greater than the inner diameter of the compressible washer.

2. The thread rolling die assembly of claim 1, wherein the swaging means on the upper portion of the first section includes a plurality of shallow thread forming ribs and grooves.

3. The thread rolling die assembly of claim 2, wherein the first longitudinal section further includes thread swaging ribs and grooves on a lower portion located beneath the slot means and spaced downwardly from the upper portion thereby.

4. The thread rolling die assembly of claim 1, wherein the slot means extend longitudinally of the workpiece engageable face generally parallel to the longitudinal margin of the upper portion of the first section, the ramp means interconnecting with the slot means and extending upwardly therefrom to the upper longitudinal margin of the second section, the upper longitudinal margin of the second section being spaced downwardly from the upper longitudinal margin of the first section.

5. The thread rolling die assembly of claim 1, wherein the slot means and ramp means extend from the entering margin of the first section with the ramp means incorporated in the slot means.

6. The thread rolling die assembly of claim 1, including a pair of opposing, unitary thread rolling dies each having opposing upper and lower swaging sections spaced by a slot means, a ramp means following the slot means on each die and adapted to fabricate a screw and washer assembly by reciprocation of one die relative to another with the screw blank and washer appropriately positioned therebetween.

7. The thread rolling die assembly of claim 1, wherein the upper surface of the slot means inclines downwardly from the entering margin of the die.

8. The thread rolling die assembly of claim 1, wherein the thread swaging surfaces on the upper, entering region of the second longitudinal section adjacent the ramp means gradually increases in depth from the ramp means toward the exiting margin of the die.

* * * * *